Feb. 13, 1940.                W. H. MUSSEY                2,190,636
                  ADJUSTABLE TIE-DOWN ANCHOR MEMBER
                      Filed Jan. 17, 1939        3 Sheets-Sheet 1
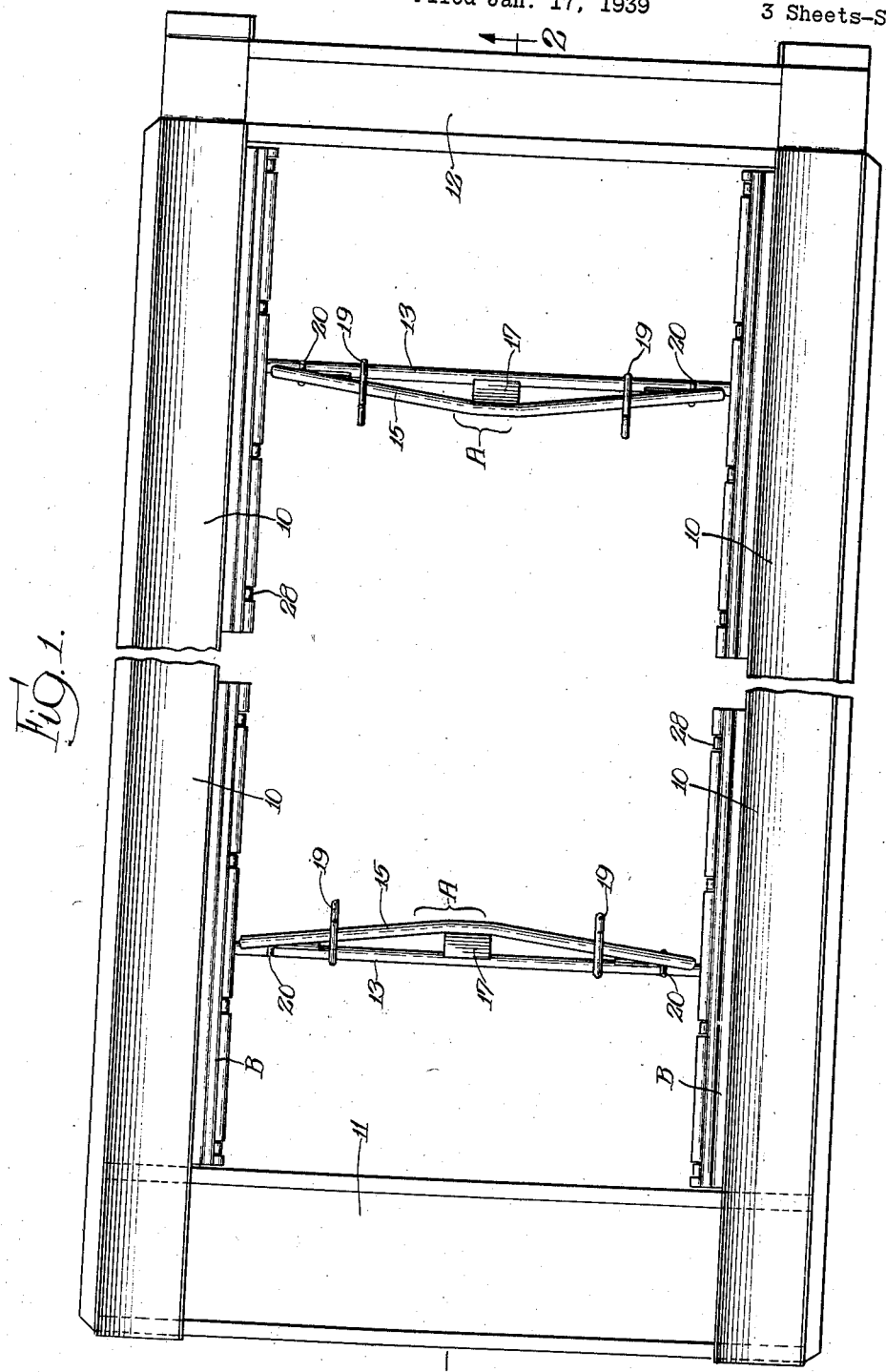
INVENTOR.
William H. Mussey
BY
ATTORNEY.

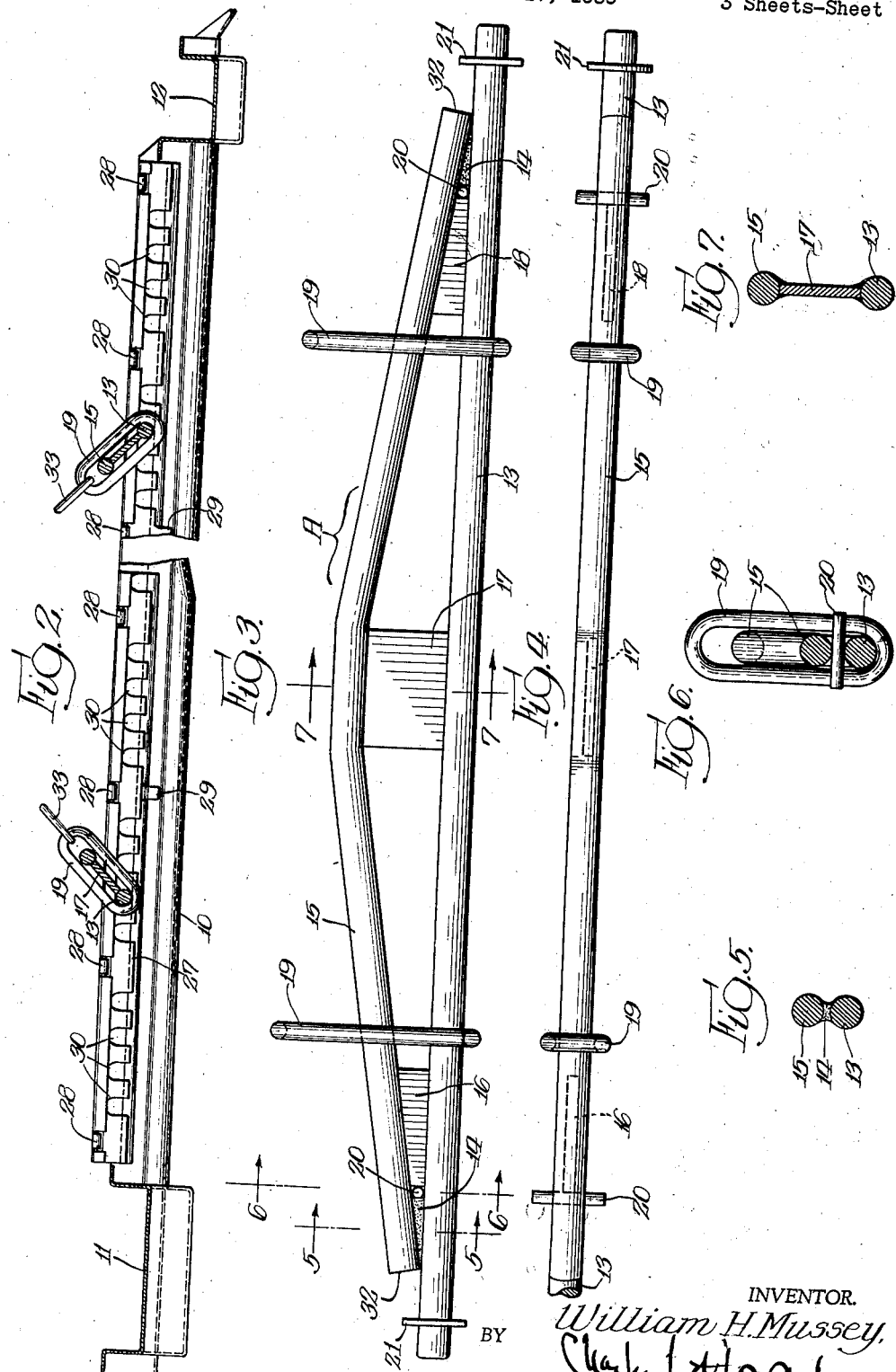
Feb. 13, 1940.  W. H. MUSSEY  2,190,636
ADJUSTABLE TIE-DOWN ANCHOR MEMBER
Filed Jan. 17, 1939  3 Sheets-Sheet 2
INVENTOR.
William H. Mussey,
BY Charles L. Howard
ATTORNEY.

Feb. 13, 1940.  W. H. MUSSEY  2,190,636
ADJUSTABLE TIE-DOWN ANCHOR MEMBER
Filed Jan. 17, 1939   3 Sheets-Sheet 3
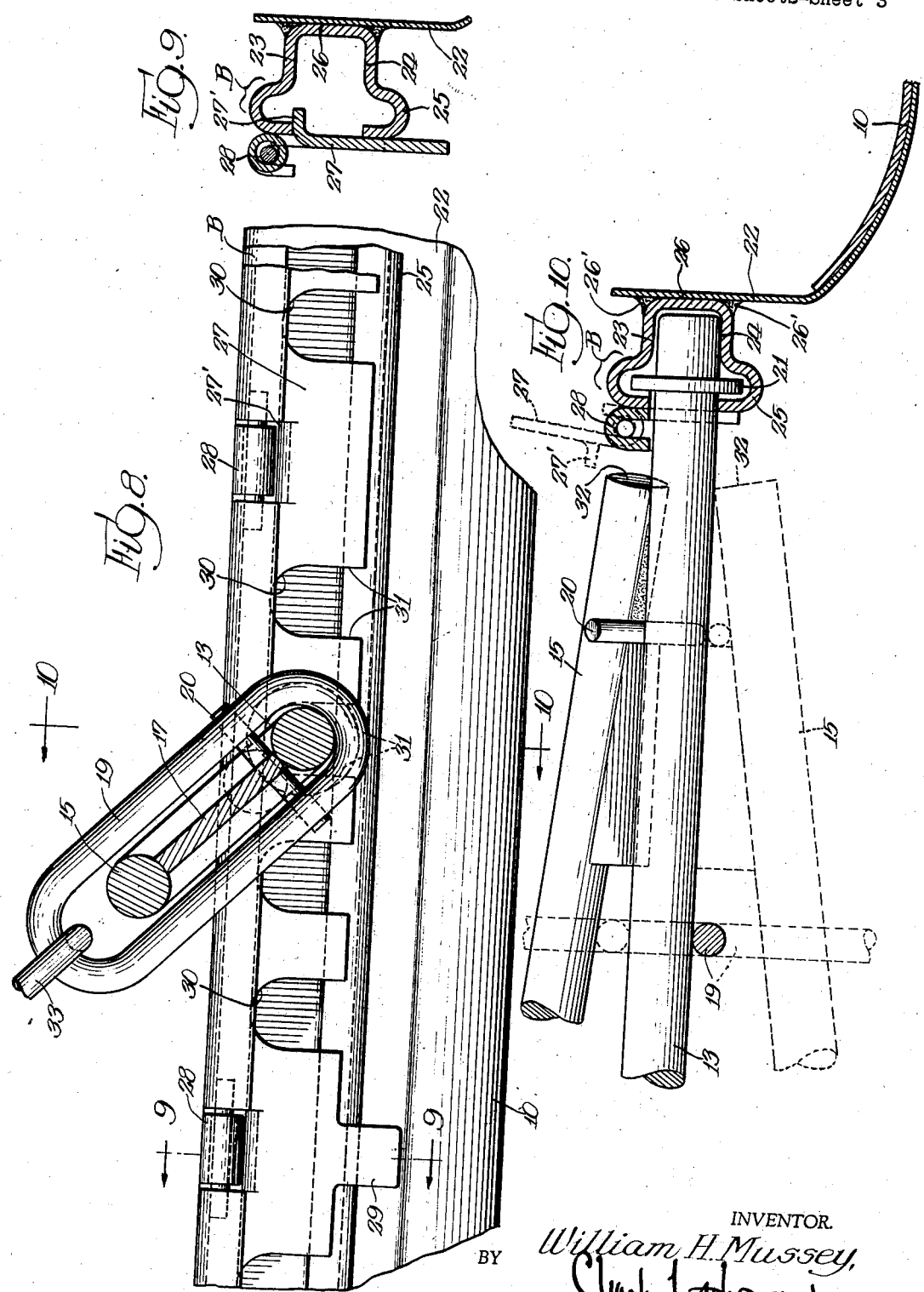
INVENTOR.
William H. Mussey,
BY
ATTORNEY.

Patented Feb. 13, 1940

2,190,636

UNITED STATES PATENT OFFICE 2,190,636

ADJUSTABLE TIE-DOWN ANCHOR MEMBER

William H. Mussey, Chicago, Ill.; Carrie S. Mussey executrix of William H. Mussey, deceased Application January 17, 1939, Serial No. 251,384

12 Claims. (Cl. 105—368)

My invention relates to adjustable anchor members for car loading devices known as tie-downs or hold-downs which are employed in anchoring an automobile or other wheeled vehicle to a deck or rack on which the vehicle is supported for transportation in a freight car.

In loading automobiles for shipment in freight cars it is common practice to support two automobiles upon the floor of the car and to support an elevated automobile upon a deck over each of the floor supported vehicles. The deck supported automobile is securely fastened to the deck by means of chains or other flexible members, known as tie-downs, which are carried by and anchored to the deck at one end and suitably attached to the wheeled vehicle at the opposite end.

In the transportation of some vehicles the flexible tie-down members are attached to the car axle; on others, to points on the vehicle underframe; on other makes of vehicles it is desirable to fix a bracket at some point on the vehicle underframe, and attach the flexible tie-down member to this bracket.

The principal object of my invention is to provide a deck having tie-down anchor members which are adjustable so that they can be moved to the desired position for attachment of the flexible members to desired points on vehicles of varying size and manufacture for properly anchoring the vehicles to the deck and preventing movement in any direction of the vehicle on the deck.

Another object of my invention is to provide tie-down anchor members which are adjustable longitudinally of the deck, and are capable of being secured at the desired point longitudinally of the deck.

A further object of my invention is to provide longitudinally adjustable tie-down anchor members for adjusting the angularity of the chain or flexible member that is attached to the anchor member at one end and attached to the vehicle at its opposite end.

Another object of my invention is to provide a vehicle supporting deck having adjustable tie-down anchor members adjacent each end of the deck.

A further object of my invention is to provide a vehicle supporting deck having adjustable tie-down anchor members, to which flexible tie-down members are secured, the parts when assembled being pilfer-proof.

Other objects of my invention will become apparent from the following description, and the drawings relating thereto.

Referring to the drawings:

Fig. 1 is a plan view of a deck for supporting a vehicle in a freight car, having adjustable tie-down anchor members thereon, the middle portion of the deck being omitted as indicated by broken lines.

Fig. 2 is an enlarged side view, taken on the line 2—2 of Fig. 1.

Fig. 3 is a detached front elevation of the adjustable tie-down anchor member.

Fig. 4 is a plan view of the adjustable tie-down anchor member.

Fig. 5 is a sectional view taken on the line 5—5 of Fig. 3.

Fig. 6 is a sectional view taken on the line 6—6 of Fig. 3.

Fig. 7 is a sectional view taken on the line 7—7 of Fig. 3.

Fig. 8 is an enlarged fragmentary view of a portion of Fig. 2, showing one of the adjustable tie-down anchor members in section.

Fig. 9 is a cross-sectional view taken on the line 9—9 of Fig. 8.

Fig. 10 is a cross-sectional view taken on the line 10—10 of Fig. 8, showing in dotted lines the position of the housing cover plate and adjustable tie-down anchor member, when the anchor member is to be moved longitudinally of the deck.

Similar reference numerals and letters refer to similar parts throughout the drawings.

As shown in Fig. 1, the deck comprises spaced longitudinally disposed wheel runways 10, and end transverse members 11 and 12. The deck carries two adjustable tie-down anchor members, each of which is designated generally by the letter A. One of the adjustable tie-down anchor members is located adjacent each end of the deck, and as each of the adjustable anchor members is identical, description of one is deemed sufficient.

As shown in Fig. 3, the tie-down anchor member is of truss form and comprises a substantially straight bar portion 13, having welded thereto at 14 a bowed bar 15, the ends of which terminate short of the ends of the bar 13 as shown in Fig. 3. The numerals 16, 17 and 18 designate reinforcing plate members which extend between and are welded to the bars 13 and 15. The tie-down anchor member has slidably mounted thereon two anchor links 19, the anchor links 19 embracing the bars 13 and 15. Pins 20 project outwardly adjacent each end of the tie-down anchor member and prevent the anchor links 19 from being moved off the anchor member. To each end of the bar 13 is welded, or otherwise suitably attached, a circular collar 21, which prevents the anchor member A from being taken out of the bar housing which will be described hereinbelow.

As clearly shown in Fig. 9 and Fig. 10, each of the wheel runways 10 has at its inner side a vertical portion 22, to which is suitably secured, preferably by welding, a bar housing designated generally by the letter B; the bar housing extending longitudinally of the deck, parallel to the wheel runways 10. As shown in Fig. 1, a bar housing B is attached to the inner vertical portion 22 of each of the transversely spaced wheel runways 10 at each end of the deck, and the oppositely disposed bar housings B are adapted to receive the ends of the bar 13.

As each end of the bar 13 of the tie-down anchor member A is mounted within the bar housing B in identical manner, description of one end of the bar is sufficient. Referring to Fig. 10, the bar housing B has a body portion 23 in which the end of the bar 13 is adapted to slide longitudinally of the deck when the locking cover plate 27 of the bar housing, which will be more fully described hereinbelow, is in open position. The end portion of the bar 13 rests upon and is supported by the horizontally disposed lower wall 24 of the bar housing B. The bar housing is provided with an enlarged portion 25 which houses the circular collar 21 that is carried adjacent the end of the bar 13. One side of the bar housing indicated by the numeral 26 in Figs. 9 and 10 abuts and is welded to the inner vertical portion 22 of the wheel runway 10, the weld being indicated by 26' in Fig. 10. The opposite side of the bar housing carries a special locking cover plate 27 which is supported by hinges 28. As shown in Fig. 9, the cover plate 27 is provided at each hinge with an inturned flange 27' which abuts the bar housing when the cover plate is in closed position. The cover plate 27 is provided with an integral extension 29 which forms a handle by means of which the cover plate 27 can be conveniently moved from its closed position shown in Figs. 2, 8 and 9 to the open position of the cover plate shown by dotted lines in Fig. 10. The cover plate 27 is provided with a plurality of spaced openings 30, each of which is defined by sides 31 that embrace the sides of the bar 13 as shown in Fig. 8, and limit longitudinal movement of the bar 13 when the cover plate is in closed position. The bar 13 of the adjustable anchor member A is moved to the desired longitudinal position while the cover plate is in open position, shown by dotted lines in Fig. 10; after which the cover plate is moved to closed position with the desired opening 30 embracing the bar 13 and the sides 31 of the opening 30 limiting further longitudinal movement of the bar 13 of the adjustable anchor member A.

Referring particularly to Fig. 10, the adjustable anchor member A must be turned so that the bowed bar 15 of the anchor member is in the substantially vertical lower position indicated by dotted lines in Fig. 10 in order that the cover plate 27 be moved to open position. If the adjustable anchor member is in its operative position as shown in Figs. 2 and 8, or in any position other than that shown by dotted lines in Fig. 10 with the bowed bar 15 in lower position, the portions of the cover plate between the openings 30 will contact the end 32 of the bar 15 and prevent the cover plate 27 from being moved to full open position to permit longitudinal movement of the adjustable anchor member A. Thus, when the anchor member A is in operative position, shown in Figs. 2 and 8, it is impossible for the cover plate 27 to accidently move to open position. The cover plate is securely locked in closed position and the anchor member cannot move longitudinally of the deck as long as the anchor member is in operative position with the bowed bar 15 above the straight bar 13 of the adjustable anchor member A.

As described hereinabove, each of the adjustable anchor members A has two anchor links 19 mounted thereon. Each of the anchor links 19 has a flexible tie-down member, one link of which is shown at 33, attached thereto. A suitable flexible tie-down member such as is shown in Fig. 3 of my co-pending patent application, Serial No. 211,992, filed June 6, 1938, is attached to each anchor link 19. This flexible member includes a chain or other suitable flexible member, an intermediate turnbuckle or suitable means for tightening the chain, and an end portion of the flexible member which is secured to a suitable point on the deck supported vehicle. This flexible member is attached at one end to the anchor link 19 of my adjustable tie-down anchor member A and to the vehicle at the opposite end. As stated above, one type of flexible member which can be thus used is shown and described in the above identified copending patent application. With the tightening of the turnbuckle, not shown in the drawings, the anchor link 19 automatically moves along the bars 13 and 15 to a position in alignment with the point of attachment of the flexible member to the vehicle.

One way of assembling the adjustable tie-down anchor member includes the welding of the bar housings B to the inner vertical portion 22 of the runways 10. The bowed bar 15 of the tie-down anchor member is welded to the straight bar 13, two anchor links 19 with flexible tie-down chains, not shown, attached thereto, having been placed over the bars 13 and 15 and the pins 20 welded in position so as to prevent the anchor links 19 from being moved off the bars 13 and 15 of the adjustable tie-down anchor member A. The collars 21 are welded or otherwise secured adjacent the ends of the bar 13, after which the ends of the bar 13 are placed in oppositely disposed bar housings B, the collars 21 being within the bar housing as shown in Fig. 10. The ends of the bar housing B can then be permanently closed so that the adjustable anchor member A cannot be removed from the deck, although it is capable of being moved longitudinally of the deck, its ends being slidable longitudinally of the deck in the bar housings B, when the cover plate 27 is in open position.

In operation, a vehicle is placed on the deck and the deck is suitably elevated to a position which permits the adjustable tie-down anchor member to be turned to the position shown by dotted lines in Fig. 10. The cover plate 27 can then be moved to open position and the adjustable tie-down anchor member can be moved longitudinally of the deck to the desired point, each end of the bar 13 being within a bar housing B. The desired point depends upon the size, length and type of vehicle that is carried by the deck and the point on the vehicle to which the flexible tie-down member is to be secured. With the adjustable tie-down anchor member in the desired position longitudinally of the deck, the cover plate 27 can then be moved to closed position, the sides 31 of one of the openings 30 of the cover plate embracing the sides of the end of the bar 13. The flexible members are then secured to the vehicle and the adjustable anchor member A turns to its operative position shown in Figs. 2 and 3; in which position it is impossible for the cover plate 27 to be opened. Upon the tightening of the flexible member, the anchor link 19 automatically moves transversely of the deck along the bars 13 and 15 to a position in alignment with the point of attachment of the flexible member to the vehicle, so that the flexible member is positioned at the point on the adjustable tie-down anchor member that is nearest to the point of attachment of the flexible member to the vehicle.

As clearly shown in Fig. 2, my adjustable tie-down anchor member can be moved so that the flexible member extends upwardly to the point of attachment to the vehicle at the desired angle, and flexible tie-down members at one end of the deck extend at the desired angle toward the flexible tie-down members at the opposite end of the deck so as to prevent movement of the vehicle in any direction when the flexible members are properly anchored and secured to the vehicle.

As shown in Fig. 1, each of the adjustable tie-down anchor members A has mounted thereon two anchor links 19, one anchor link being adjacent each side of the anchor member. Thus the position longitudinally of the deck in which the anchor member is secured controls the point of anchorage of two flexible tie-down members, one of which extends from each anchor link 19 to the point of attachment of the flexible member to the vehicle.

It will be seen from the foregoing that my adjustable tie-down anchor member provides a relatively simple and inexpensive means for adjusting the point at which the flexible tie-down member is anchored to the deck or rack. It possesses great flexibility and is adapted to fasten vehicles of varying size and manufacture in the desired manner to a deck. The adjustability of my tie-down anchor member enables it to be properly positioned with relation to the point on the vehicle to which the flexible member is attached, and also enables the angularity of the flexible member to be controlled to the desired degree, regardless of the wheel base of the vehicle or the point on the vehicle to which the flexible member is secured.

Although only one form of my invention has been illustrated and described in detail it will be apparent to those skilled in the art that various modifications may be made without departing from the scope of the appended claims.

I claim:

1. A vehicle supporting deck including a pair of longitudinally extending transversely spaced wheel supporting runways said deck having an adjustable tie-down anchor member extending transversely of the deck, the ends of said anchor member being slidable in housings which are carried by the deck, said housings having means for securing the anchor member in fixed position.

2. Means for anchoring a flexible tie-down member including a vehicle supporting deck provided with spaced wheel supporting runways, each runway having associated therewith a housing in which one end of an adjustable anchor member is supported, said anchor member extending transversely of the deck from the housing associated with one runway to the housing associated with the runway spaced therefrom, the housings including means for securing the anchor member at the desired point longitudinally of the deck.

3. A vehicle supporting deck having an adjustable tie-down anchor member each end of which is mounted in a housing carried by the deck, said adjustable tie-down anchor member extending transversely from one side to the opposite side of the deck, the housing for one end of said anchor member being at one side of the deck and the housing for the other end of said anchor member being at the opposite side of the deck, each housing having a hinged cover plate adapted to prevent longitudinal movement of the anchor member when said cover plate is in closed position.

4. A vehicle supporting deck having an adjustable tie-down anchor member each end of which is mounted in a housing carried by the deck, said adjustable tie-down anchor member extending transversely of the deck, the housing for one end of said anchor member being located at one side of the deck and the housing for the other end of said anchor member being located at the opposite side of the deck, each housing having a hinged cover plate provided with a plurality of spaced openings adapted to embrace the end of the anchor member when in closed position and prevent longitudinal movement of the anchor member.

5. A vehicle supporting deck having longitudinally extending, transversely spaced wheel supporting runways to which are secured housings adapted to receive the ends of an adjustable tie-down anchor member, said tie-down anchor member extending transversely of the deck with one of its ends received in a housing on one side of the deck and the other end of said anchor member being received in a housing on the opposite side of the deck, each of said housings having a hinged cover plate adapted when in closed position to secure said anchor member against movement longitudinally of the deck.

6. An adjustable tie-down anchor member of truss formation including a substantially straight bar to which the ends of a bowed bar are secured, said anchor member having anchor links slidably mounted thereon, pins adjacent the ends of said anchor member for limiting outward movement of said anchor links.

7. An adjustable tie-down anchor member each end of which is slidably mounted in a housing carried by a vehicle supporting deck, said tie-down anchor member extending transversely of the deck, one of the housings which receives an end of the anchor member being located on one side of the deck and the housing which receives the other end of said anchor member being located on the opposite side of the deck, said housing having a hinged cover plate which is provided with a plurality of spaced openings, the openings being defined by side walls which embrace the end of said anchor member and secure same against longitudinal movement when said cover plate is in closed position.

8. A vehicle supporting deck having spaced housings each of which receives one end of an adjustable tie-down anchor member which extends transversely from side to side of the deck, each of said housings having a cover plate provided with a plurality of spaced openings, said anchor member being capable of adjustment longitudinally of said deck when said cover plate is in open position and said anchor member being secured against longitudinal movement when said cover plate is in closed position.

9. A vehicle supporting deck having spaced housings each of which receives one end of an adjustable tie-down anchor member, said tie-down anchor member extending transversely of the deck, the housings for the ends of the anchor member being located at each side of the deck, a collar adjacent each end of said anchor member, one collar being received in each housing and adapted to prevent removal of the adjustable tie-down anchor member from the deck.

10. A vehicle supporting deck having spaced housings located on opposite sides of said deck, each of which receives the end of an adjustable tie-down anchor member which extends from side to side of the deck, each of said housings being provided with a hinged cover plate having a plurality of spaced openings, said anchor member being capable of adjustment longitudinally of said deck when said cover plates are in open position and said anchor member being secured against longitudinal movement when the cover plates are in closed position and means adjacent each end of the anchor member for preventing its removal from the housing.

11. The combination defined by claim 10 in which said anchor member is adapted to prevent the opening of the cover plates when said anchor member is in operative position.

12. A vehicle supporting deck provided with spaced housings each of which has one end of an adjustable tie-down anchor member mounted therein, said tie-down anchor member extending transversely of the deck with one of its ends mounted in a housing on one side of the deck and its other end mounted in a housing on the opposite side of said deck, each of said housings being provided with a cover plate adapted to hold said anchor member in fixed position when said cover plates are in closed position, said anchor member being capable of movement longitudinally of the deck when said cover plates are in open position.

WILLIAM H. MUSSEY.